(12) United States Patent
Hashiguchi

(10) Patent No.: US 11,079,785 B2
(45) Date of Patent: Aug. 3, 2021

(54) LINEAR REGULATOR FOR OUTPUTTING NORMAL OUTPUT VOLTAGE AND VEHICLE INCLUDING THE SAME

(71) Applicant: Rohm Co., Ltd., Kyoto (JP)

(72) Inventor: Shingo Hashiguchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 12 days.

(21) Appl. No.: 16/292,476

(22) Filed: Mar. 5, 2019

(65) Prior Publication Data

US 2019/0278314 A1    Sep. 12, 2019

(30) Foreign Application Priority Data

Mar. 8, 2018 (JP) .............................. JP2018-041789

(51) Int. Cl.
*G05F 1/59* (2006.01)
*B60R 16/033* (2006.01)
*G05F 1/575* (2006.01)
*B60L 3/00* (2019.01)

(52) U.S. Cl.
CPC .............. *G05F 1/59* (2013.01); *B60R 16/033* (2013.01); *G05F 1/575* (2013.01); *B60L 3/0023* (2013.01)

(58) Field of Classification Search
CPC .... G05F 1/00; B60R 16/00; B60L 3/00; H02J 9/00; H03K 17/00
See application file for complete search history.

(56) References Cited

U.S. PATENT DOCUMENTS

| 6,150,799 A | 11/2000 | Barth et al. |
| 9,625,926 B1 | 4/2017 | Hoque |
| 2007/0236279 A1 | 10/2007 | Novak |
| 2007/0285152 A1* | 12/2007 | Fujita ........................ G05F 1/56 327/541 |
| 2012/0176109 A1 | 7/2012 | Riederer |
| 2015/0015224 A1* | 1/2015 | Yasusaka ................ G05F 1/575 323/280 |

(Continued)

FOREIGN PATENT DOCUMENTS

| DE | 19710440 A1 | 9/1998 |
| DE | 102006017048 A1 | 10/2007 |

(Continued)

OTHER PUBLICATIONS

German Patent Office; Office Action mailed in counterpart German Patent Application No. 10 2019 203 007.6 (dated Jul. 9, 2020) with English-language translation.

*Primary Examiner* — Rexford N Barnie
*Assistant Examiner* — Joseph N Inge
(74) *Attorney, Agent, or Firm* — Fish & Richardson P.C.

(57) ABSTRACT

There is provided a linear regulator including: a first output transistor connected between a first input terminal to which a first input voltage is applied and an output terminal from which an output voltage is outputted; a second output transistor connected between a second input terminal to which a second input voltage is applied and the output terminal; and a control circuit configured to control the first output transistor when the second input voltage of a predetermined range is not supplied to the second input terminal, and to control the second output transistor when the first input voltage of the predetermined range is not supplied to the first input terminal.

11 Claims, 7 Drawing Sheets

(56) References Cited

U.S. PATENT DOCUMENTS

2015/0333568 A1* 11/2015 Batra .................. H02J 9/061
                                                        307/66
2016/0334819 A1* 11/2016 Pelicia ................ G05F 1/575

FOREIGN PATENT DOCUMENTS

| DE | 102012100146 A1 | 7/2012 |
|----|-----------------|--------|
| JP | 2008-046901     | 2/2008 |

* cited by examiner

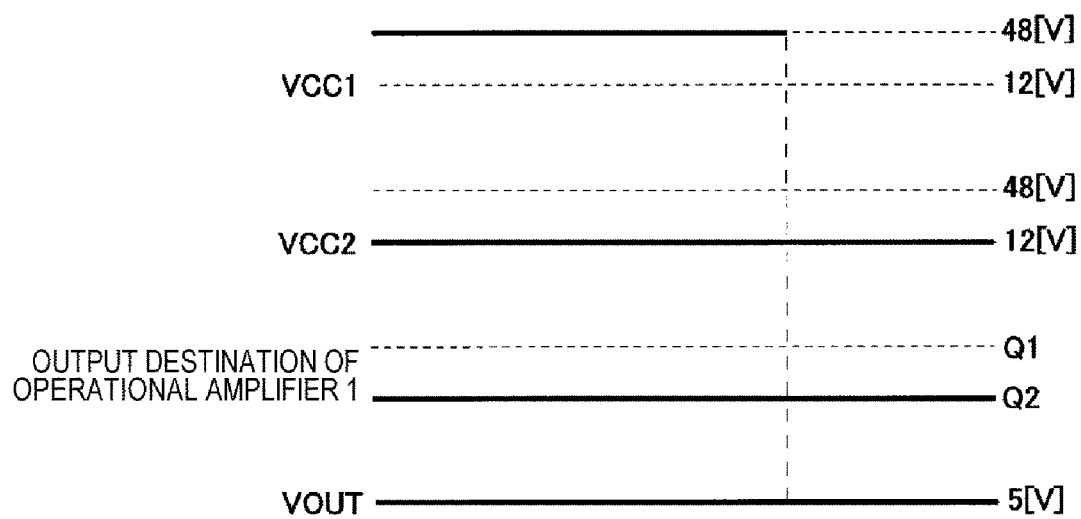
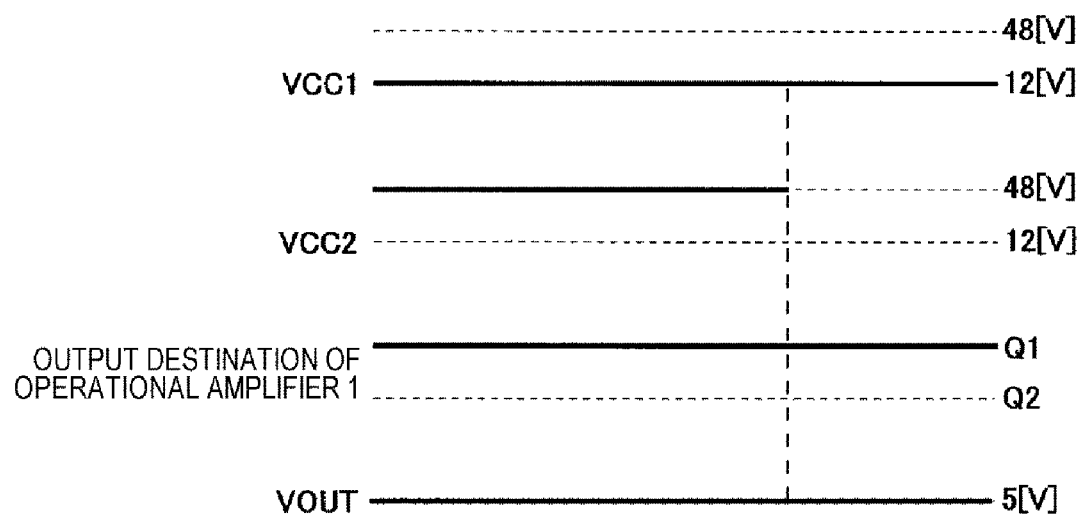

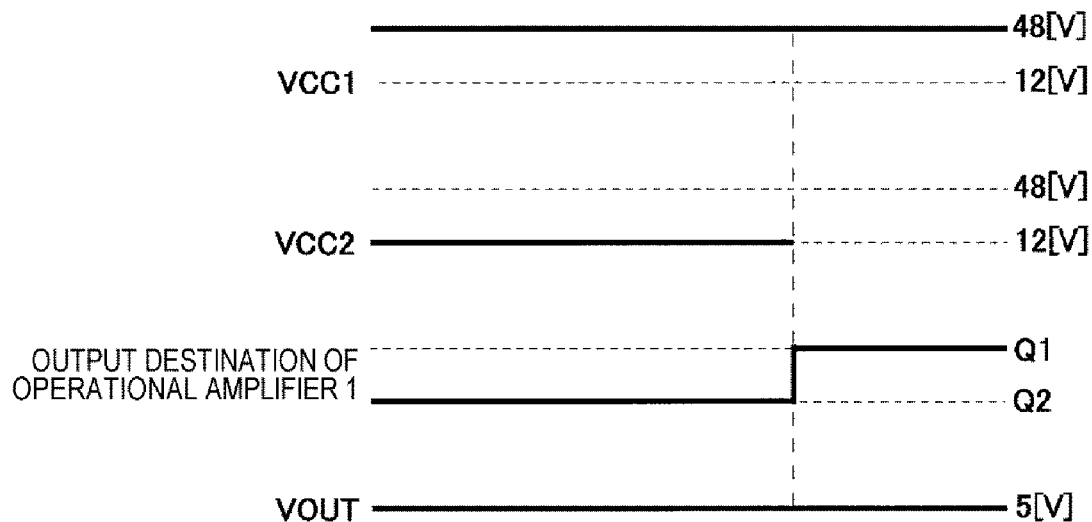
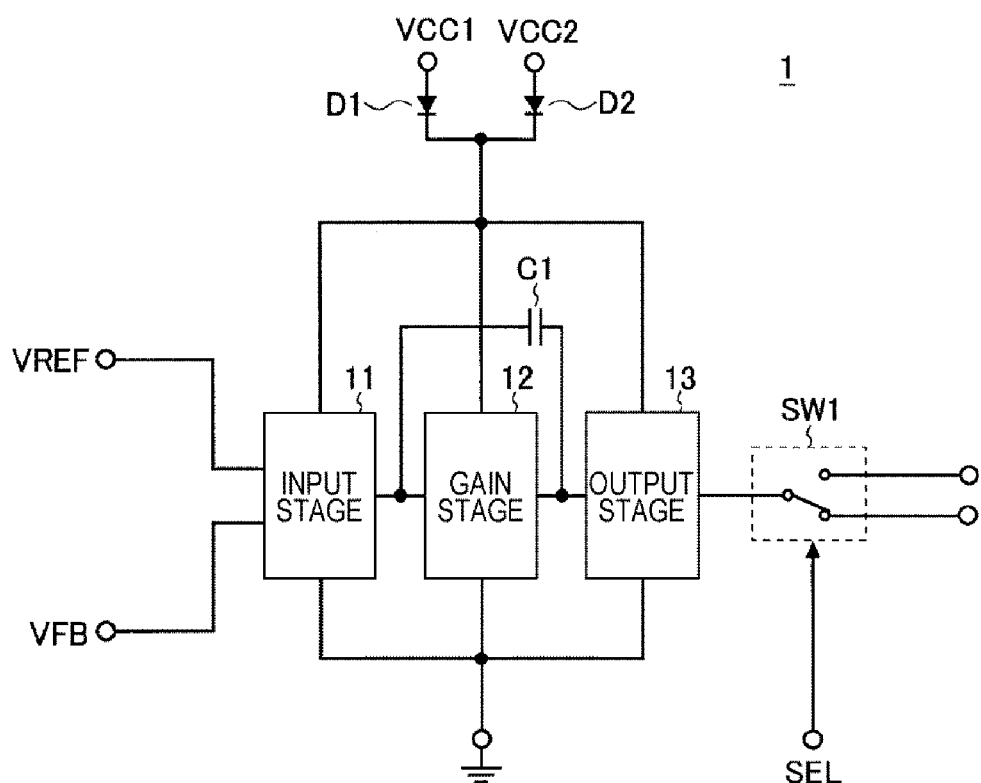

LINEAR REGULATOR FOR OUTPUTTING NORMAL OUTPUT VOLTAGE AND VEHICLE INCLUDING THE SAME

CROSS-REFERENCE TO RELATED APPLICATION

This application is based upon and claims the benefit of priority from Japanese Patent Application No. 2018-041789, filed on Mar. 8, 2018, the entire contents of which are incorporated herein by reference.

TECHNICAL FIELD

The present disclosure relates to a power supply, and more particularly to a linear regulator.

BACKGROUND

It is desirable that a vehicle has a limp home function that enables the vehicle to move a short distance so as to move to a safe place even if the vehicle cannot be driven normally due to occurrence of a malfunction.

In recent years, research and development on automatic driving techniques of vehicles have progressed at a vigorous pace. At automation Level 3 (conditional automation), Level 4 (advanced automation), and Level 5 (fully automation) defined by SAE (Society of Automotive Engineers), an automatic operation system performs all dynamic operation works, so that a driver becomes unnecessary. Therefore, it is considered that the aforementioned limp home function is substantially essential for a vehicle in which the automatic operation of Level 3 to Level 5 is executed.

A linear regulator equipped in a vehicle and related to the limp home function should have a configuration capable of outputting a normal output voltage even when an abnormality occurs in an input voltage. An example of a linear regulator having such a configuration is disclosed in the related art.

The linear regulator disclosed in the related art is a two-input one-output linear regulator to which a first input voltage and a second input voltage are input, and is capable of outputting a normal output voltage by using only the first input voltage even when the second input voltage is not supplied.

However, the linear regulator disclosed in the related art has a problem that it is impossible to output an output voltage when the first input voltage is not supplied.

SUMMARY

Some embodiments of the present disclosure provide a linear regulator having a high tolerance to a loss of an input voltage, and a vehicle including the linear regulator.

According to one embodiment of the present disclosure, there is provided a linear regulator including: a first output transistor connected between a first input terminal to which a first input voltage is applied and an output terminal from which an output voltage is outputted; a second output transistor connected between a second input terminal to which a second input voltage is applied and the output terminal; and a control circuit configured to control the first output transistor when the second input voltage of a predetermined range is not supplied to the second input terminal, and to control the second output transistor when the first input voltage of the predetermined range is not supplied to the first input terminal (first configuration).

In the linear regulator of the first configuration, there is provided a configuration that, when the first input voltage of the predetermined range is supplied to the first input terminal and the second input voltage of the predetermined range is supplied to the second input terminal, the control circuit controls the first output transistor if the first input voltage is smaller than the second input voltage, and controls the second output transistor if the second input voltage is smaller than the first input voltage (second configuration).

In the linear regulator of the first configuration or the second configuration, there is provided a configuration that, when the first input voltage of the predetermined range is supplied to the first input terminal and the second input voltage of the predetermined range is supplied to the second input terminal, the control circuit is configured to uses the second input voltage as a driving voltage of the control circuit when the first input voltage is smaller than the second input voltage, and to use the first input voltage as a driving voltage of the control circuit when the second input voltage is smaller than the first input voltage (third configuration).

In the linear regulator of the third configuration, there is provided a configuration that the control circuit is configured to use the first input voltage as a driving voltage of the control circuit when the second input voltage of the predetermined range is not supplied to the second input terminal, and to use the second input voltage as a driving voltage of the control circuit when the first input voltage of the predetermined range is not supplied to the first input terminal (fourth configuration).

In the linear regulator of the fourth configuration, there is provided a configuration that the control circuit includes a first diode and a second diode, the first input voltage is applied to an anode of the first diode, he second input voltage is applied to an anode of the second diode, a cathode of the first diode and a cathode of the second diode are connected in common, and cathode voltages of the first diode and the second diode are used as the driving voltage of the control circuit (fifth configuration).

In the linear regulator of any one of the first to fifth configurations, there is provided a configuration that the linear regulator is accommodated in a semiconductor package, and a third terminal of the semiconductor package is installed between a first terminal of the semiconductor package to which the first input voltage is applied and a second terminal of the semiconductor package to which the second input voltage is applied (sixth configuration).

In the linear regulator of any one of the first to fifth configurations, there is provided a configuration that the linear regulator is accommodated in a semiconductor package, the semiconductor package has substantially a rectangular shape when viewed from top, and a first terminal of the semiconductor package to which the first input voltage is applied and a second terminal of the semiconductor package to which the second input voltage is applied are placed on different sides of a substantially rectangular shape (seventh configuration).

According to one embodiment of the preset disclosure, there is provided a vehicle including the linear regulator of any one of the first to seventh configurations, a first battery configured to supply the first input voltage to the linear regulator, and a second battery configured to supply the second input voltage to the linear regulator (eighth configuration).

BRIEF DESCRIPTION OF DRAWINGS

FIG. 3 is a timing diagram showing a schematic operation of the linear regulator.

FIG. 4 is a timing diagram showing a schematic operation of the linear regulator.

FIG. 5 is a timing diagram showing a schematic operation of the linear regulator.

FIG. 6 is a diagram showing a configuration example of an operational amplifier.

DETAILED DESCRIPTION

<1. Configuration of Linear Regulator>

Figure 1:
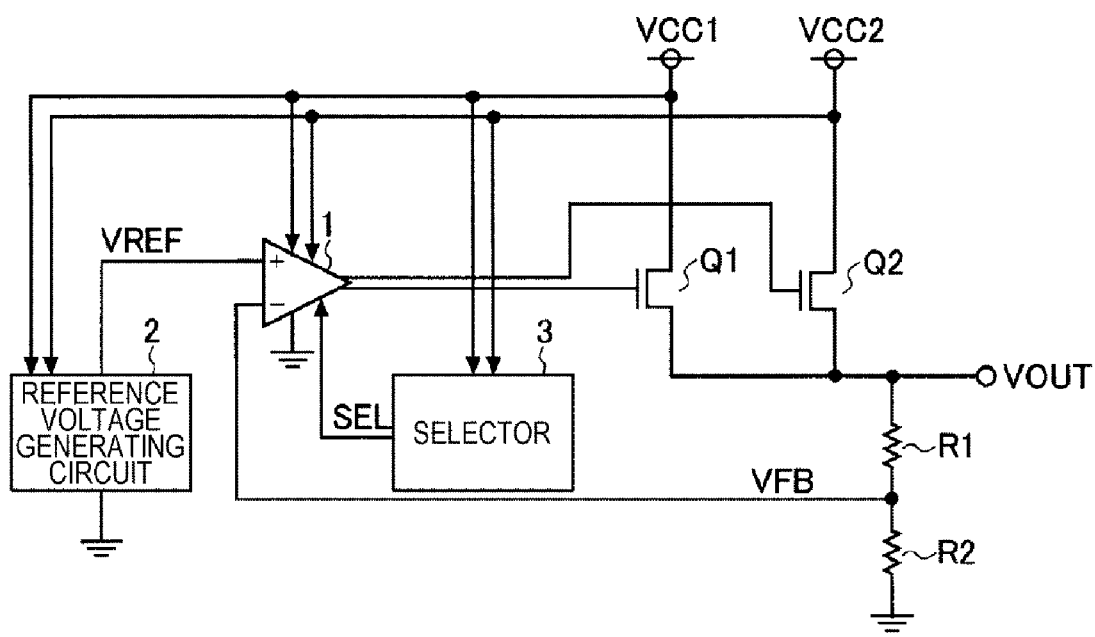
FIG. 1 is a diagram showing a configuration example of a linear regulator.

FIG. 1 is a diagram showing a configuration example of a linear regulator. The linear regulator 100 includes an operational amplifier 1, a reference voltage generating circuit 2, a selector 3, a first output transistor Q1, a second output transistor Q2, and voltage dividing resistors R1 and R2.

The operational amplifier 1 uses a first input voltage VCC1 or a second input voltage VCC2 as a driving voltage of the operational amplifier 1. Similarly, the reference voltage generating circuit 2 uses the first input voltage VCC1 or the second input voltage VCC2 as a driving voltage of the reference voltage generating circuit 2, and the selector 3 uses the first input voltage VCC1 or the second input voltage VCC2 as a driving voltage of the selector 3.

The first output transistor Q1 is connected between a first input terminal to which the first input voltage VCC1 is applied, and an output terminal from which an output voltage VOUT is output. The second output transistor Q2 is connected between a second input terminal to which the second input voltage VCC2 is applied, and the output terminal from which the output voltage VOUT is output. In the present embodiment, each of the first output transistor Q1 and the second output transistor Q2 is a MOSFET (Metal Oxide Semiconductor Field Effect Transistor).

The voltage dividing resistors R1 and R2 divide the output voltage VOUT to generate a feedback voltage VFB. The feedback voltage VFB is supplied to the inverting input terminal of the operational amplifier 1.

The reference voltage generating circuit 2 generates a reference voltage VREF. The reference voltage VREF is supplied to the non-inverting input terminal of the operational amplifier 1.

The operational amplifier 1 generates a control signal based on a difference (VREF-VFB) between the reference voltage VREF and the feedback voltage VFB. The voltage level of the control signal generated by the operational amplifier 1 increases as the difference (VREF-VFB) between the reference voltage VREF and the feedback voltage VFB increases.

The operational amplifier 1 is configured to determine one of the first output transistor Q1 and the second output transistor Q2, to which the control signal is to be sent based on a selection signal SEL output from the selector 3, and send the control signal to the determined one of the first output transistor Q1 and the second output transistor Q2. The source-drain voltage of the output transistor that receives the control signal from the operational amplifier 1 has a value corresponding to the voltage level of the control signal.

The selector 3 generates the selection signal SEL based on the value of the first input voltage VCC1 applied to the first input terminal and the value of the second input voltage VCC2 applied to the second input terminal.

Figure 2:
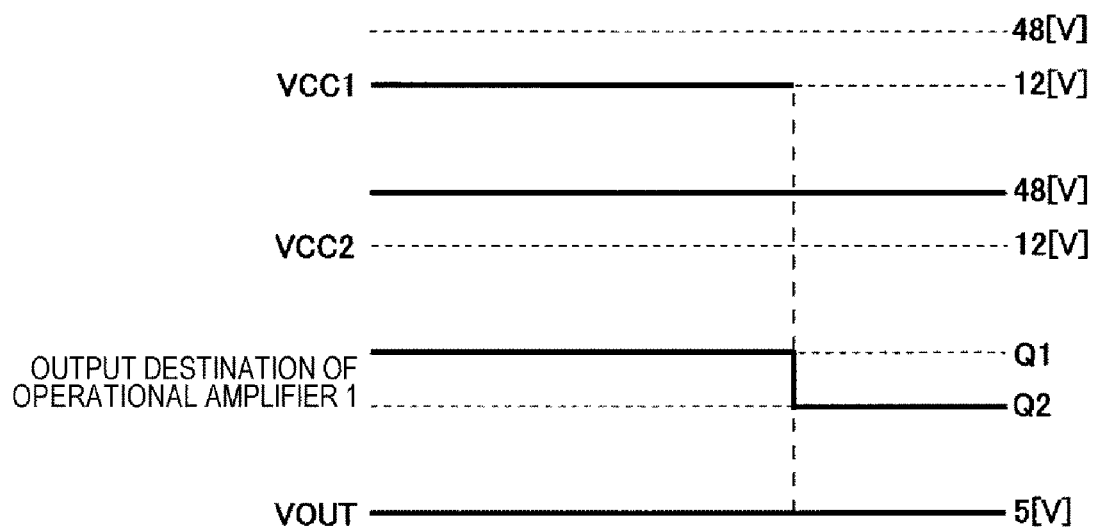
FIG. 2 is a timing diagram showing a schematic operation of the linear regulator.

When it is detected that the second input voltage VCC2 of a predetermined range (e.g., 6[V] or more) is not supplied to the second input terminal, the selector 3 generates the selection signal SEL for selecting the first output transistor Q1 as the output destination of the operational amplifier 1. Thus, even when the second input voltage VCC2 is not supplied to the second input terminal, if the first input voltage VCC1 of a predetermined range (e.g., 6[V] or more) is supplied to the first input terminal, the linear regulator 100 can output a normal output voltage VOUT, that is, the output voltage VOUT of a predetermined value (for example, 5[V]) (see FIGS. 2 and 3).

When it is detected that the first input voltage VCC1 of a predetermined range (for example, 6[V] or more) is not supplied to the first input terminal, the selector 3 generates the selection signal SEL for selecting the second output transistor Q2 as the output destination of the operational amplifier 1. Thus, even when the first input voltage VCC1 is not supplied to the first input terminal, if the second input voltage VCC2 of a predetermined range (for example, 6[V] or more) is supplied to the second input terminal, the linear regulator 100 can output a normal output voltage VOUT, that is, the output voltage VOUT of a predetermined value (for example, 5[V]) (see FIGS. 4 and 5).

As can be seen above, the linear regulator 100 can output the normal output voltage VOUT in both the case of losing only the second input voltage VCC2 and the case of losing only the first input voltage VCC1. Therefore, the linear regulator 100 has high tolerance to loss of the input voltage than the linear regulator disclosed in the related art.

Further, when it is detected that the first input voltage VCC1 of the predetermined range (for example, 6[V] or more) is supplied to the first input terminal and the second input voltage VCC2 of the predetermined range (for example, 6[V] or more) is supplied to the second input terminal, the selector 3 determines a magnitude relation between the first input voltage VCC1 and the second input voltage VCC2. If it is determined that the first input voltage VCC1 is smaller than the second input voltage VCC2, the selector 3 generates the selection signal SEL for selecting the first output transistor Q1 as the output destination of the operational amplifier 1 (see FIGS. 2 and 4). On the other hand, if it is determined that the second input voltage VCC2 is smaller than the first input voltage VCC1, the selector 3 generates the selection signal SEL for selecting the second output transistor Q2 as the output destination of the operational amplifier 1 (FIGS. 3 and 5). As a result, it is possible to improve the efficiency in case that any of the first input voltage VCC1 and the second input voltage VCC2 is not lost.

If it is determined that the first input voltage VCC1 and the second input voltage VCC2 are equal to each other, the selector 3 may generate the selection signal SEL for selecting the first output transistor Q1 as the output destination of the operational amplifier 1 or may generate the selection signal SEL for selecting the second output transistor Q2 as the output destination of the operational amplifier 1.

Unlike the present embodiment, the linear regulator 100 may have a specification assuming that the first input voltage VCC1 is lower than the second input voltage VCC2 when both the first input voltage VCC1 and the second input voltage VCC2 are normal. In this specification, upon detecting that the first input voltage VCC1 of the predetermined range (e.g., 6[V] or more) is supplied to the first input terminal and the second input voltage VCC2 of the predetermined range (for example, 6[V] or more) is supplied to the second input terminal, the selector 3 may generate the selection signal SEL for selecting the first output transistor Q1 as the output destination of the operational amplifier 1.

When the first input voltage VCC1 is reduced, there may be a concern that a current flows backward from the output terminal, which outputs the output voltage VOUT, to the first input terminal to which the first input voltage VCC1 is applied, via the body diode of the first output transistor Q1. Therefore, it is desirable to interpose a diode for preventing backflow between the first output transistor Q1 and the output terminal for outputting the output voltage VOUT. Similarly, when the second input voltage VCC2 is reduced, there may be a concern that a current flows backward from the output terminal, which outputs the output voltage VOUT, to the second input terminal to which the second input voltage VCC2 is applied, via the body diode of the second output transistor Q2. Therefore, it is desirable to interpose a diode for preventing backflow between the second output transistor Q2 and the output terminal for outputting the output voltage VOUT.

<2. Configuration of Operational Amplifier>

FIG. 6 is a diagram showing a configuration example of the operational amplifier 1. In the configuration example shown in FIG. 6, the operational amplifier 1 includes a first diode D1, a second diode D2, an input stage 11, a gain stage 12, an output stage 13, a phase compensation capacitor C1 for preventing oscillation, and a switch SW1. The switch SW1 determines its own state based on the selection signal SEL.

The first input voltage VCC1 is applied to the anode of the first diode Dl. The second input voltage VCC2 is applied to the anode of the second diode D2. The cathode of the first diode D1 and the cathode of the second diode D2 are connected in common. The cathode voltages of the first diode D1 and the second diode D2 are used as driving voltages of the respective input stage 11, the gain stage 12 and the output stage 13.

According to the configuration example shown in FIG. 6, when the first input voltage VCC1 of the predetermined range (for example, 6[V] or more) is supplied to the first input terminal of the linear regulator 100 and the second input voltage VCC2 of the predetermined range (for example, 6[V] or more) is supplied to the second input terminal of the linear regulator 100, if the first input voltage VCC1 is smaller than the second input voltage VCC2, the second input voltage VCC2 becomes the driving voltage. On the other hand, if the second input voltage VCC2 is smaller than the first input voltage VCC1, the first input voltage VCC1 becomes the driving voltage. Further, when the second input voltage VCC2 of the predetermined range (for example, 6[V] or more) is not supplied to the second input terminal of the linear regulator 100, the first input voltage VCC1 becomes the driving voltage. On the other hand, when the first input voltage VCC1 of the predetermined range (for example, 6[V] or more) is not supplied to the first input terminal of the linear regulator 100, the second input voltage VCC2 becomes the driving voltage.

That is, according to the configuration example shown in FIG. 6, since the driving voltage of the operational amplifier 1 can be secured independently from the selection signal SEL, the configuration of the operational amplifier 1 can be simplified. In addition, for the reference voltage generating circuit 2 and the selector 3, it is possible to secure the drive voltage independently of the selection signal SEL by using two diodes similar to the configuration example of the operational amplifier 1 shown in FIG. 6.

Figure 7:
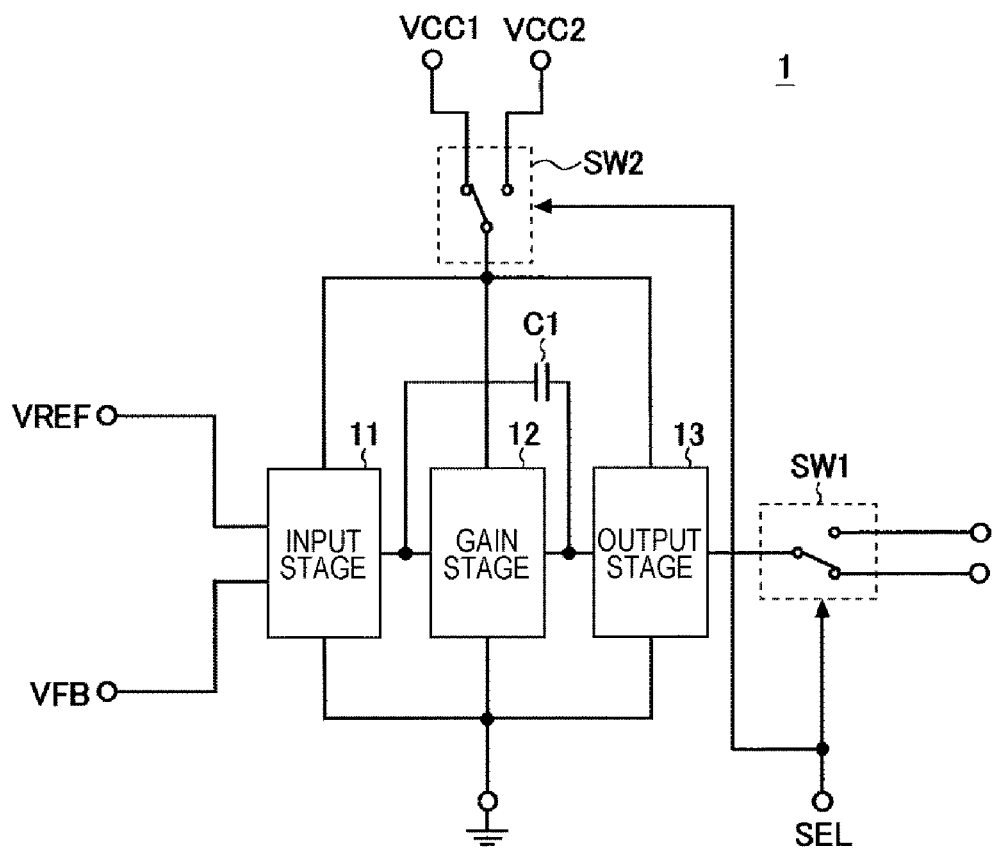
FIG. 7 is a diagram showing another configuration example of the operational amplifier.

The operational amplifier 1 may be configured as shown in FIG. 7 by using a switch SW2 instead of the first diode D1 and the second diode D2.

In the configuration example shown in FIG. 7, when the selection signal SEL is a signal for selecting the first output transistor Q1 as the output destination of the operational amplifier 1, the switch SW2 is configured to select the first input voltage VCC1 based on the selection signal SEL. On the other hand, when the selection signal SEL is a signal for selecting the second output transistor Q2 as the output destination of the operational amplifier 1, the switch SW2 is configured to select the second input voltage VCC2 based on the selection signal SEL.

In addition, for the reference voltage generating circuit 2 and the selector 3, a switch can be used instead of the two diodes, similar to the configuration example of the operational amplifier 1 shown in FIG. 7. For the reference voltage generating circuit 2 and the selector 3, when a switch is used instead of the two diodes, the selection signal SEL may also be supplied to the reference voltage generating circuit 2 and the selector 3.

<3. Terminal Layout of Semiconductor Package>

Figure 8:
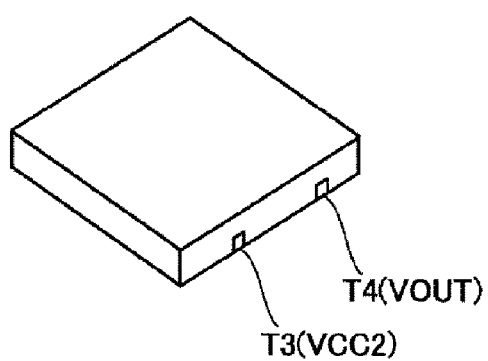
FIG. 8 is an upper perspective view of a semiconductor package.
Figure 9:
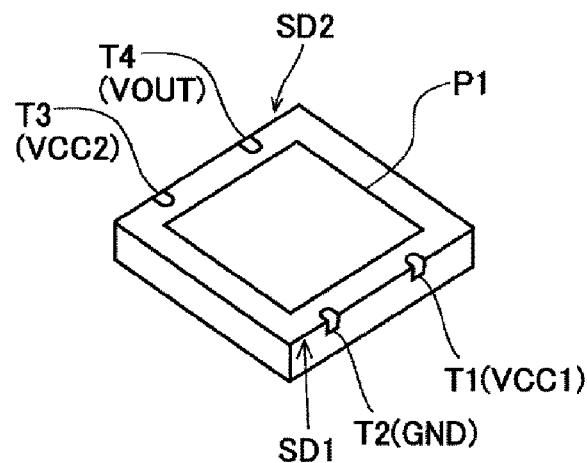
FIG. 9 is a lower perspective view of the semiconductor package.
Figure 10:
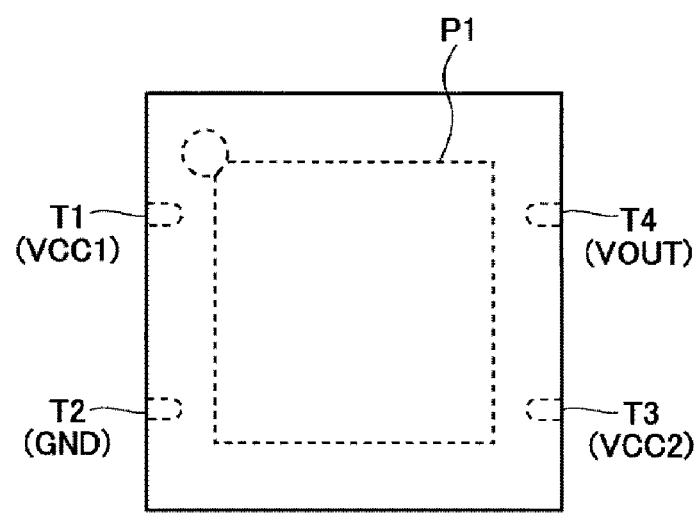
FIG. 10 is a top view of the semiconductor package.

The linear regulator 100 is accommodated in a semiconductor package U1 shown in FIGS. 8 to 10, for example.

As shown in FIGS. 8 and 9, the semiconductor package U1 is a SON (Small Outline Non-leaded) package, in which four terminals T1 to T4 are placed on two opposing sides of the bottom portion and a square heat dissipation pad P1 is placed on the center of the bottom portion. FIG. 10 is a top view of the semiconductor package U1.

The first terminal T1 is a terminal to which the first input voltage VCC1 is input. The second terminal T2 is a terminal connected to the ground potential. The third terminal T3 is a terminal to which the second input voltage VCC2 is input. The fourth terminal T4 is a terminal for outputting the output voltage VOUT.

The first terminal T1 and the second terminal T2 are placed on a first side SD1 of the bottom portion of the semiconductor package U1. The third terminal T3 and the fourth terminal T4 are placed on a second side SD2 of the bottom portion of the semiconductor package U1. The first side SD1 and the second side SD2 of the bottom portion of the semiconductor package U1 face each other.

By placing the first terminal T1 and the third terminal T3 on the different sides, short-circuit between the first terminal T1 and the third terminal T3 is prevented. In case that the first terminal T1 and the third terminal T3 are short-circuited, when one of the first input voltage VCC1 and the second input voltage VCC2 is reduced, the other is also reduced. Thus, this situation is avoided by devising the layout of the terminals.

In the semiconductor package U1, the side on which the first terminal T1 is placed and the side on which the third terminal T3 is placed face each other. However, even when the side on which the first terminal T1 is placed and the side on which the third terminal T3 is placed are adjacent to each other, the same effect can be obtained. That is, the terminal to which the first input voltage VCC1 is input and the terminal to which the second input voltage VCC2 is input may be placed on different sides of a substantially rectangular shape.

Figure 11:
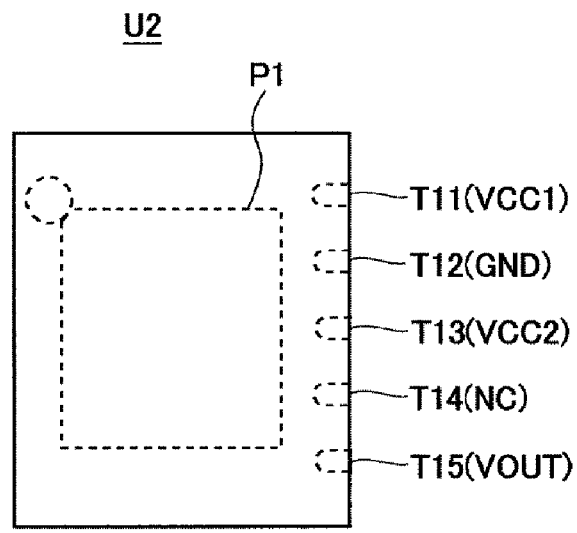
FIG. 11 is a top view of another semiconductor package.

When the terminal to which the first input voltage VCC1 is input and the terminal to which the second input voltage VCC2 is input are placed on the same side, a semiconductor package having a configuration, in which another terminal is provided between the terminal to which the first input voltage VCC1 is input and the terminal to which the second input voltage VCC2 is input, may be provided. Even with this configuration, it is possible to prevent short-circuit between the terminal to which the first input voltage VCC1 is input and the terminal to which the second input voltage VCC2 is input. FIG. 11 shows an example of a semiconductor package having this configuration. FIG. 11 is a top view of a semiconductor package U2.

A first terminal T11 is a terminal to which the first input voltage VCC1 is input. A second terminal T12 is a terminal connected to the ground potential. A third terminal T13 is a terminal to which the second input voltage VCC2 is input. A fourth terminal T14 is a terminal not connected to the internal circuit of the semiconductor package U2. A fifth terminal T15 is a terminal that outputs the output voltage VOUT.

Figure 12:
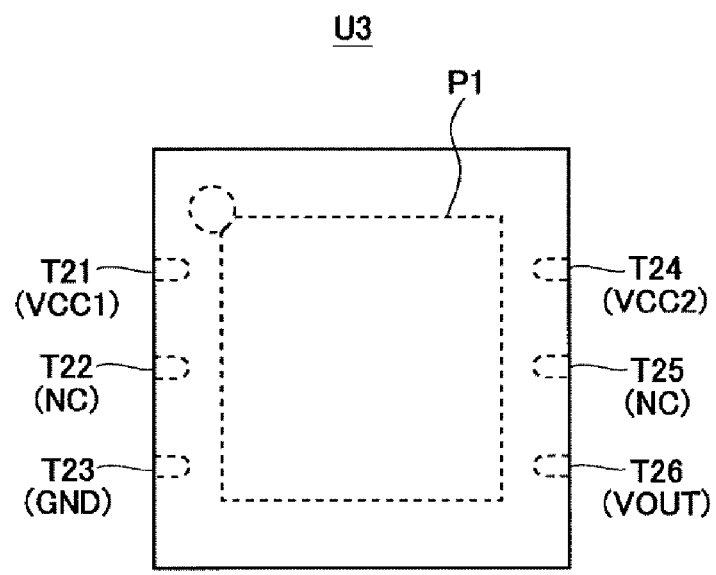
FIG. 12 is a top view of still another semiconductor package.

When the terminal to which the first input voltage VCC1 is input and the non-input terminal are placed on the same side, it is desirable to interpose the terminal not connected to the internal circuit of the semiconductor package between the terminal to which the first input voltage VCC1 is input and the non-input terminal. Similarly, when the terminal to which the second input voltage VCC2 is input and the non-input terminal are placed on the same side, it is desirable to interpose the terminal not connected to the internal circuit of the semiconductor package between the terminal to which the second input voltage VCC2 is input and the non-input terminal. An example of a semiconductor package satisfying such conditions is shown in FIG. 12, which is a top view of a semiconductor package U3.

A first terminal T21 is a terminal to which the first input voltage VCC1 is input. A second terminal T22 is a terminal not connected to the internal circuit of the semiconductor package U3. A third terminal T23 is a terminal connected to the ground potential. A fourth terminal T24 is a terminal to which the second input voltage VCC2 is input. A fifth terminal T25 is a terminal not connected to the internal circuit of the semiconductor package U3. A sixth terminal T26 is a terminal that outputs the output voltage VOUT.

<4. Applications>

Figure 13:
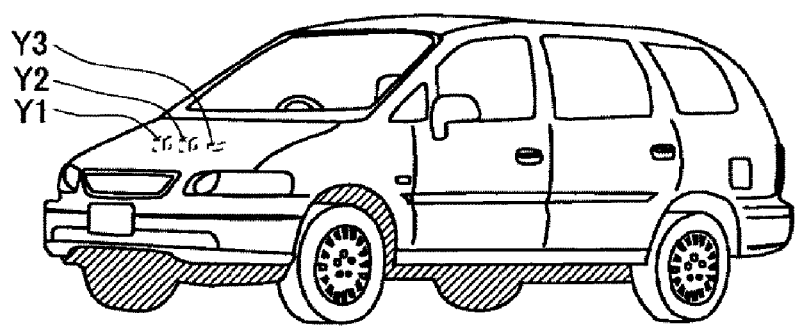
FIG. 13 is an external view of a vehicle.

Next, an application example of the above-described linear regulator will be described. FIG. 13 is an external view of a vehicle. A vehicle X is equipped with a first battery Y1, a second battery Y2, and a linear regulator Y3.

The first battery Y1 supplies the first input voltage VCC1 to the linear regulator Y3. The second battery Y2 supplies the second input voltage VCC2 to the linear regulator Y3. The first battery Y1 and the second battery Y2 may be the same type or different types. In addition, the first input voltage VCC1 and the second input voltage VCC2 may be substantially equal to each other or may be clearly different from each other.

For example, when the first battery Y1 is a lead battery, the first input voltage VCC1 may be a DC voltage of about 12[V]. When the second battery Y2 is a lithium ion battery, the second input voltage VCC2 may be a DC voltage of about 48[V].

<Others>

In addition to the above embodiments, the configuration of the present disclosure can be modified in various ways without departing from the spirit and scope of the present disclosure.

For example, in the above-described embodiments, although a MOSFET is used as an output transistor, a bipolar transistor may be used as the output transistor.

In addition, in the above-described embodiments, although a linear regulator equipped in a vehicle has been described as an application example of the linear regulator, the present disclosure is not limited thereto. The present disclosure can be applied to linear regulators used in all fields (including home electronics, automobiles, industrial machinery, etc.).

According to the present disclosure in some embodiments, it is possible to provide a two-input one-output linear regulator having a first input voltage and a second input voltage. The linear regulator can output a normal output voltage when the normal first input voltage is supplied even when the second input voltage is not supplied, and can also output a normal output voltage when the normal second input voltage is supplied even when the first input voltage is not supplied. Therefore, according to the linear regulator and the vehicle including the linear regulator disclosed in the present disclosure, it is possible to increase the tolerance to loss of an input voltage supplied to the linear regulator.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A linear regulator comprising:
    a first output transistor connected between a first input terminal to which a first input voltage is applied and an output terminal from which an output voltage is outputted;
    a second output transistor connected between a second input terminal to which a second input voltage is applied and the output terminal; and
    a control circuit configured to control the first output transistor when the second input voltage of a predetermined range is not supplied to the second input terminal, and to control the second output transistor when the first input voltage of the predetermined range is not supplied to the first input terminal,
    wherein the control circuit includes an operational amplifier configured to receive a reference voltage and a feedback voltage generated based on the output voltage, and to output a control signal based on a difference between the reference voltage and the feedback voltage,
    wherein the operational amplifier is configured to use the first input voltage or the second input voltage as a driving voltage of the operational amplifier,
    wherein the operational amplifier is configured such that, when the first input voltage of the predetermined range is supplied to the first input terminal and the second input voltage of the predetermined range is supplied to the second input terminal, the operational amplifier uses the second input voltage as the driving voltage of the operational amplifier when the first input voltage is smaller than the second input voltage, and uses the first input voltage as the driving voltage of the operational amplifier when the second input voltage is smaller than the first input voltage, wherein the operational amplifier is configured to use the first input voltage as the driving voltage of the operational amplifier when the second input voltage of the predetermined range is not supplied to the second input terminal, and to use the second input voltage as the driving voltage of the operational amplifier when the first input voltage of the predetermined range is not supplied to the first input terminal, wherein the operational amplifier includes a first diode and a second diode, wherein the first input voltage is applied to an anode of the first diode, wherein the second input voltage is applied to an anode of the second diode, and wherein a cathode of the first diode and a cathode of the second diode are connected in common, and cathode voltages of the first diode and the second diode are used as the driving voltage of the operational amplifier.

2. The linear regulator of claim 1, wherein, when the first input voltage of the predetermined range is supplied to the first input terminal and the second input voltage of the predetermined range is supplied to the second input terminal, the control circuit controls the first output transistor if the first input voltage is smaller than the second input voltage, and controls the second output transistor if the second input voltage is smaller than the first input voltage.

3. The linear regulator of claim 1, wherein the linear regulator is accommodated in a semiconductor package, and
wherein a third terminal of the semiconductor package is installed between a first terminal of the semiconductor package to which the first input voltage is applied and a second terminal of the semiconductor package to which the second input voltage is applied.

4. The linear regulator of claim 1, wherein the linear regulator is accommodated in a semiconductor package,
wherein the semiconductor package has a rectangular shape when viewed from top, and
wherein a first terminal of the semiconductor package to which the first input voltage is applied and a second terminal of the semiconductor package to which the second input voltage is applied are placed on different sides of the rectangular shape.

5. A vehicle comprising:
the linear regulator of claim 1;
a first battery configured to supply the first input voltage to the linear regulator; and
a second battery configured to supply the second input voltage to the linear regulator.

6. A linear regulator comprising:
a first output transistor connected between a first input terminal to which a first input voltage is applied and an output terminal from which an output voltage is outputted;
a second output transistor connected between a second input terminal to which a second input voltage is applied and the output terminal; and
a control circuit configured to control the first output transistor when the second input voltage of a predetermined range is not supplied to the second input terminal, and to control the second output transistor when the first input voltage of the predetermined range is not supplied to the first input terminal, wherein the control circuit includes an operational amplifier configured to receive a reference voltage and a feedback voltage generated based on the output voltage, and to output a control signal based on a difference between the reference voltage and the feedback voltage, wherein the operational amplifier is configured such that, when the first input voltage of the predetermined range is supplied to the first input terminal and the second input voltage of the predetermined range is supplied to the second input terminal, the operational amplifier:
uses the second input voltage as a driving voltage of the operational amplifier when the first input voltage is smaller than the second input voltage; and
uses the first input voltage as the driving voltage of the operational amplifier when the second input voltage is smaller than the first input voltage, wherein the operational amplifier is configured to use the first input voltage as the driving voltage of the operational amplifier when the second input voltage of the predetermined range is not supplied to the second input terminal, and to use the second input voltage as the driving voltage of the operational amplifier when the first input voltage of the predetermined range is not supplied to the first input terminal, wherein the operational amplifier includes a first diode and a second diode, wherein the first input voltage is applied to an anode of the first diode, wherein the second input voltage is applied to an anode of the second diode, and wherein a cathode of the first diode and a cathode of the second diode are connected in common, and cathode voltages of the first diode and the second diode are used as the driving voltage of the operational amplifier.

7. The linear regulator of claim 6, wherein, when the first input voltage of the predetermined range is supplied to the first input terminal and the second input voltage of the predetermined range is supplied to the second input terminal, the control circuit controls the first output transistor if the first input voltage is smaller than the second input voltage, and controls the second output transistor if the second input voltage is smaller than the first input voltage.

8. The linear regulator of claim 6, wherein the linear regulator is accommodated in a semiconductor package, and
wherein a third terminal of the semiconductor package is installed between a first terminal of the semiconductor package to which the first input voltage is applied and a second terminal of the semiconductor package to which the second input voltage is applied.

9. The linear regulator of claim 6, wherein the linear regulator is accommodated in a semiconductor package,
wherein the semiconductor package has a rectangular shape when viewed from top, and
wherein a first terminal of the semiconductor package to which the first input voltage is applied and a second terminal of the semiconductor package to which the second input voltage is applied are placed on different sides of the rectangular shape.

10. A vehicle comprising:
the linear regulator of claim 6;
a first battery configured to supply the first input voltage to the linear regulator; and
a second battery configured to supply the second input voltage to the linear regulator.

11. A linear regulator comprising:
a first output transistor connected between a first input terminal to which a first input voltage is applied and an output terminal from which an output voltage is outputted;
a second output transistor connected between a second input terminal to which a second input voltage is applied and the output terminal; and
a control circuit configured to control the first output transistor when the second input voltage of a predetermined range is not supplied to the second input terminal, and to control the second output transistor when the first input voltage of the predetermined range is not supplied to the first input terminal,
wherein, when the first input voltage of the predetermined range is supplied to the first input terminal and the second input voltage of the predetermined range is supplied to the second input terminal, the control circuit is configured to uses the second input voltage as a driving voltage of the control circuit when the first input voltage is smaller than the second input voltage, and to use the first input voltage as the driving voltage of the control circuit when the second input voltage is smaller than the first input voltage,
wherein the control circuit is configured to use the first input voltage as the driving voltage of the control circuit when the second input voltage of the predetermined range is not supplied to the second input terminal, and to use the second input voltage as the driving voltage of the control circuit when the first input voltage of the predetermined range is not supplied to the first input terminal,
wherein the control circuit includes a first diode and a second diode,
wherein the first input voltage is applied to an anode of the first diode,
wherein the second input voltage is applied to an anode of the second diode, and
wherein a cathode of the first diode and a cathode of the second diode are connected in common, and cathode voltages of the first diode and the second diode are used as the driving voltage of the control circuit.

* * * * *